Dec. 25, 1945.   A. M. GEIST ET AL   2,391,409
ELECTRICAL WIRING DEVICE
Filed Jan. 24, 1944    2 Sheets-Sheet 2
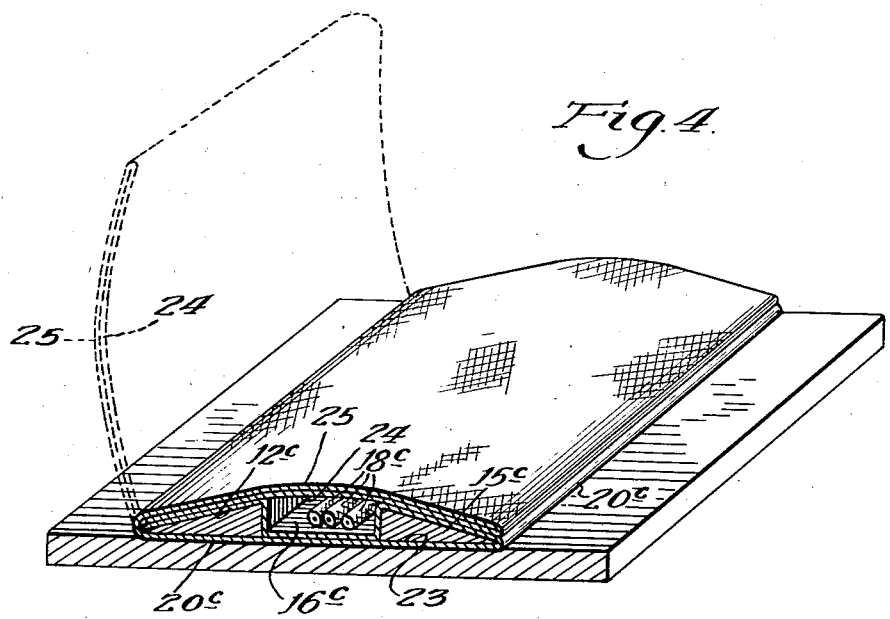
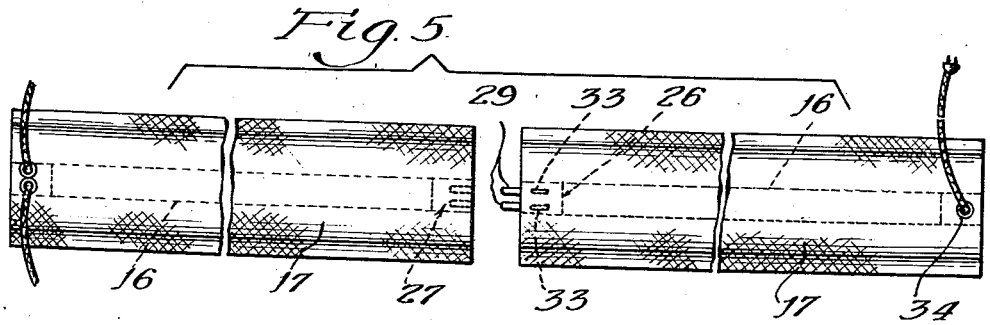
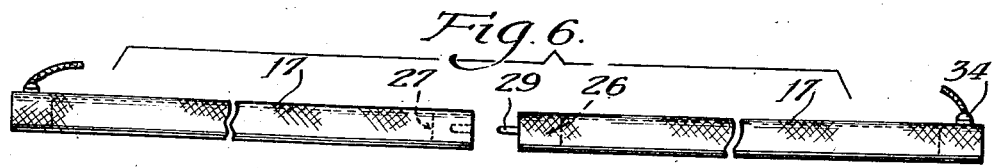
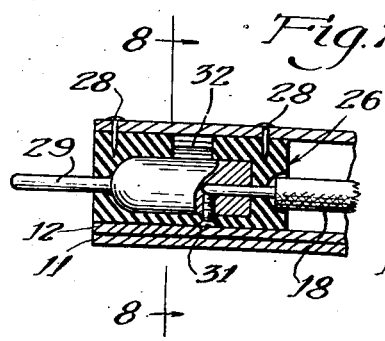
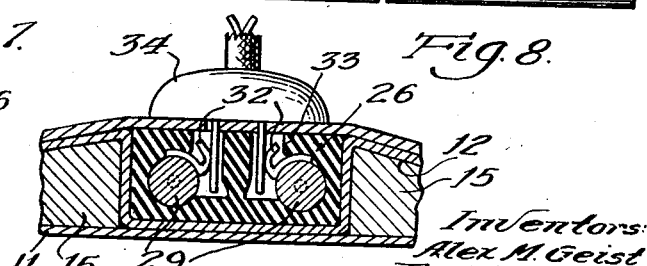
Inventors:
Alex M. Geist
Rex R. Winders
By Wallace and Cannon
Attorneys Patented Dec. 25, 1945

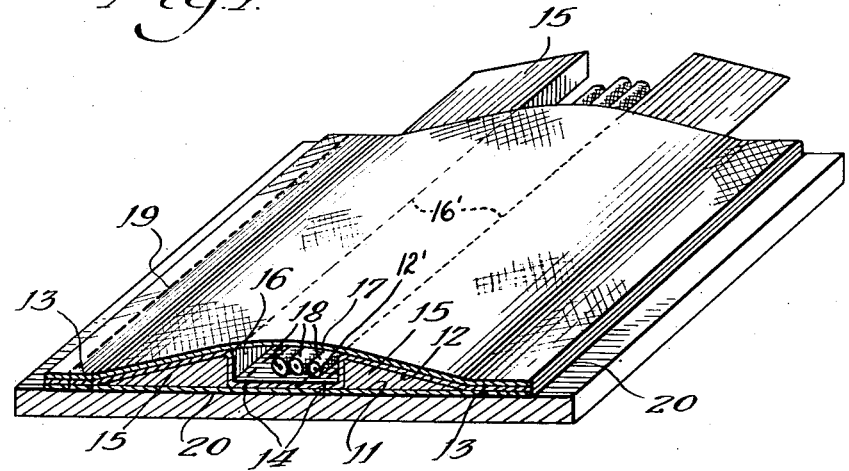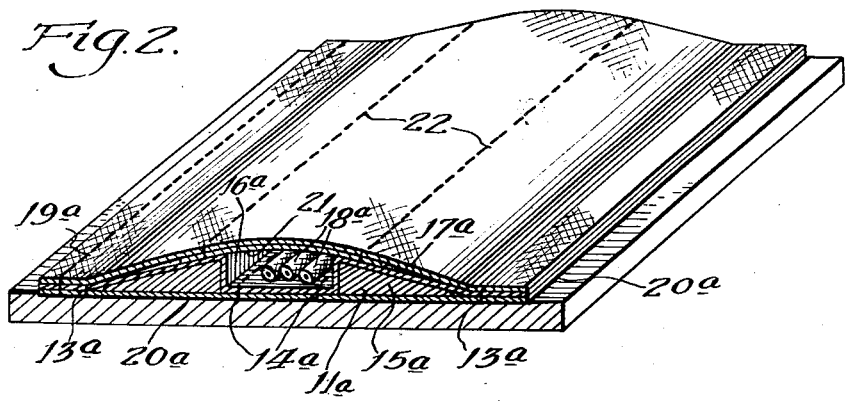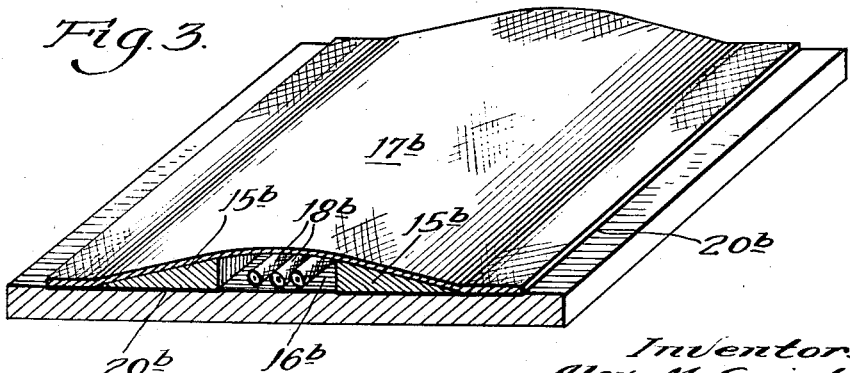

2,391,409

UNITED STATES PATENT OFFICE 2,391,409

ELECTRICAL WIRING DEVICE

Alex M. Geist and Rex R. Winders,
Lincoln, Nebr.

Application January 24, 1944, Serial No. 519,424

10 Claims. (Cl. 138—75)

This invention relates to improvements in electrical wiring devices and particularly has to do with prefabricated or partially prefabricated floor ducts of a type embodying structural characteristics which render the devices useful on exposed floor areas or for concealment beneath rugs or other floor coverings.

Considerable difficulty and expense frequently is incurred in arranging electrical conductors on smooth surfaces, such as floors, because of the requirement that such conductors be adequately protected against damage which might result from being struck by objects moved across the surface. This usually has resulted in the need to embed the conductors permanently in the floor; a practice which is often quite costly and the results of which are far from satisfactory because of the inadequacy of the patching made necessary and further because, once installed, the conductors cannot be easily and quickly removed and relocated elsewhere. Moreover, where conduits or the like are laid upon a floor to accommodate electrical conductors, and such conduits project above the floor, these conduits are unsightly, interfere with the transportation of devices across the floor, and are otherwise objectionable. It is, therefore, an object of our invention to enable electrical conductors to be directed over a surface, such as a floor, in such manner as to be fully protected against injury and yet enable devices to be readily moved over the protection afforded for the conductors and to also avoid other objections to devices of the character heretofore employed to protect electrical conductors laid upon a floor or other surface.

Furthermore, in instances where electrical conductors of a kind known as extension cords are extended along a floor to accommodate various electrical appliances such as, for example, lamps or electrical appliances, a floor covering such as a rug frequently is often laid thereover. While a floor covering tends to protect the conductors against damage resulting from moving of objects thereacross, its presence beneath the floor covering is objectionable from the standpoint of appearance because its path beneath the floor covering is clearly outlined by a rather prominent bulge or ridge. Should the floor covering be of a kind which is relatively stiff and likely to crack unless retained flat, the laying of such conductors therebeneath is prevented. It therefore is another object of this invention to provide a duct for electrical conductors which is particularly adapted to be laid beneath a floor covering in such manner as to prevent unsightly or otherwise objectionable bulges or ridges in said covering.

Prior known attempts to overcome the objectionable characteristics of electrical conductors as outlined hereinabove have resulted in the development of relatively wide flat conductors sheathed in rubber, but these also are objectionable because of the tendency of the rubber sheath to flatten under pressure and ultimately become hardened and finally crack and break under stress with the result that the conductors therein become exposed and short circuits occur. It is, therefore, a further object of the present invention to provide a duct for electrical conductors which is suitably fabricated of material which will not only retain the shape required to protect the electrical conductors therein against damage but which will not readily crack, break or otherwise deteriorate to an extent that will expose the electrical conductors.

Other known types of ducts or conductors of the kind adapted to be arranged beneath or over a floor covering usually are prefabricated and made available in excessive lengths which are cut to suit the particular requirements of a specified installation and which must be connected to conventional fittings to establish circuit from a source of electrical current to appliances or the like. This disadvantage is overcome by the structure of the present invention which has for another of its objects the provision of a flat duct of a predetermined length having a plurality of connector fittings embodied therein so as to facilitate its being connected easily and quickly to a source of electrical current and to one or more appliances or to enable a plurality of such lengths to be connected end to end.

Another object is to provide a duct for electrical conductors of the kind exemplified herein, which is inexpensive to manufacture and which may be prefabricated in whole or in part at the place of manufacture and, if prefabricated in part only, which may easily and quickly be assembled and installed in little time and at small expense.

Other and further objects of the present invention will be apparent from the following description and claims and are illustrated in the accompanying drawings which, by way of illustration, show preferred embodiments and the principle thereof and which we now consider to be the best modes in which we have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a sectional view, in perspective, showing an installation embodying features of this invention;

Fig. 2 is a sectional view, in perspective, showing an installation substantially like that illustrated in Fig. 1 but embodying a modified construction;

Fig. 3 is a sectional view, in perspective, illustrating yet another embodiment of the present invention;

Fig. 4 is a sectional view, in perspective, showing still another modified form of construction;

Fig. 5 is a top plan view of a plurality of lengths of prefabricated duct, embodying features of the invention, illustrating the manner by which the lengths may be interconnected;

Fig. 6 is a side elevational view of the duct installation illustrated in Fig. 5;

Fig. 7 is an enlarged longitudinal sectional view through an end of a length of duct as shown in Figs. 5 and 6, and showing an interconnecting and appliance connecting receptacle in detail; and Fig. 8 is a transverse sectional view, taken substantially on line 8—8 on Fig. 7.

The duct of the present invention preferably is fashioned in strips of lengths which may be handled conveniently and which receive electrical conductors within a longitudinal channel located between the side margins of the strips. The margins are substantially triangular in section to afford a gradual rise from the longitudinal edges of the strip transversely to the top edges of the walls of the channel. Such a structure provides a duct which gradually increases in thickness as its center is approached so as to thereby afford a smooth top surface contour which will not obstruct the movement of articles across the surface on which it is laid, and further, one which will not cause a pronounced bulge or ridge to be evident in a floor covering laid thereover. The duct of the present invention further is designed to be easily and cheaply prefabricated of inexpensive material and laid by persons not skilled in the construction or assembly of such articles or it may be partially prefabricated for on the job assembly by skilled craftsmen.

Referring now to the wholly prefabricated structure shown in Fig. 1 of the accompanying drawings, the duct is fashioned from a plurality of strips of fabric arranged face to face and suitably stitched along their lengths to provide pockets to receive stiffening elements which also serve to impart the required configuration to the device, and also to provide a protecting channel into which one or more electrical conductors may be laid and concealed. Specifically, the duct includes a bottom layer or strip 11, preferably of tough woven material, and a second strip 12 of like material superposed thereover, and the two strips are secured together along their complemental margins by longitudinal rows of stitches 13. The second or top strip 12 is slightly wider than the bottom strip 11 and its medial area 12' is secured flat to the underlying medial area of the bottom strip 11 by two or more transversely spaced longitudinal rows of stitches 14. Hence, the excess material in the top strip 12 is confined between its longitudinal margins and the rows of stitches 14 so as to thereby provide longitudinal pockets each to receive a stiffening element 15.

The stiffening element 15 may be fashioned from strips of wood, plastic, or any other suitable tough shape retaining material, and each is substantially triangular in section. The elements 15 are, as shown, of sufficient sectional area to completely fill the pockets in which they are received so that the material of the top strip 12 is drawn substantially taut thereover. The elements 15 are arranged with their relatively wide or base edges disposed inwardly toward each other to provide vertical walls for the medial longitudinal channel 16 formed therebetween and gradually inclined surfaces extending from the top edges of the channel walls downwardly towards the respective longitudinal margins of the joined woven strips 11 and 12. In Fig. 1 the dotted lines 16' indicate the top edges of the side walls of the channel 16.

A third strip of tough woven material 17 is laid over the assembly described hereinabove, and this strip is secured along one margin to the duct preferably by a row of stitches 19 and when laid over the duct it may be cemented or glued or otherwise retained in place. The strip 17 may be secured in position in the just described manner at the time of fabrication of our novel device, and in this event the electrical conductors will need to be threaded into the channel adapted to receive the same. It will, therefore, usually be desirable to secure the third strip 17 in position after the device is installed in its position of use and the electrical conductors have been laid in the channel adapted to receive them.

A duct constructed in the manner hereinabove described is inexpensive to manufacture and may be laid easily and quickly to accommodate and protect electrical conductors as 18. Moreover, because of the relative flatness and the gradual rise toward the longitudinal center, the duct may be substantially concealed beneath a floor covering. When laid in an exposed position on a surface, the duct does not offer serious obstruction to, nor will it be easily damaged by, the movement of articles thereover. If desired, the duct may be cemented to the surface on which it is laid as by a cement 20.

The embodiment of the present invention illustrated in Fig. 2 is substantially like that illustrated in Fig. 1 and where elements disclosed in Fig. 2 correspond to those illustrated and described with reference to Fig. 1, the same reference character is applied to corresponding elements but the suffix a is added to these reference characters as they appear in Fig. 2. Thus, a covering strip 17a is reinforced at its medial portion by having a relatively narrow strip 21 of like material sewn thereto by stitches 22 so as to increase the stiffness of the covering where it bridges the underlying conductor receiving channel 16a in which the conductors 18a are adapted to be housed.

The duct illustrated in Fig. 3 is of a kind that is partly prefabricated at the time of manufacture and is intended for assembly at the time of installation. Here again where elements appear in Fig. 3 that correspond to elements shown in Figs. 1 and 2 the same reference character is applied to corresponding elements in these three views but in Fig. 3 the suffix b is added to the reference characters. Thus, in this embodiment, two stiffening elements 15b, formed of tough shape retaining material, such as wood or the like, are arranged on the floor surface in spaced relation to each other to provide an electrical conductor receiving channel 16b. The elements preferably are secured in place by cement 20b, and a strip 17b of tough woven material is laid thereover. The strip 17b is of sufficient width so that its longitudinal margins extend beyond the outside edges of the stiffening elements 15b and they are cemented to the floor surface so as to retain the strip 17b taut.

The embodiment of the invention illustrated in Fig. 4 also is a partially prefabricated construction. Here a relatively wide strip of tough woven material is afforded which may be secured to a floor surface, preferably by cement 20c, thereby to provide a bottom membrane 23. Triangularly-shaped stiffening elements 15c then are laid over the membrane 23 in spaced relation one to the other and one margin 12c of the woven material is folded over the top of the stiffening strips. The portion of the woven material bridging the gap between the stiffening members is pressed downwardly into the gap so as to thereby provide a lining for the longitudinal electrical conductor receiving channel 16c. The electrical conductors 18c may then be laid in the channel 16c. The other marginal portion of the woven material is then folded over upon itself to provide a flap of two thicknesses 24 and 25, as indicated in dotted lines, and this double flap then is folded downwardly over the partially assembled duct to provide a relatively stiff covering therefor. Prior to laying the flap over the duct, either the flap or the duct facing 12c is coated with an adhesive so that when the flap is laid in place and drawn smooth and taut it is held against displacement.

It has been mentioned hereinabove that ducts constructed in the various fashions herein disclosed are made up in convenient lengths and that they may be provided with outlet receptacles to establish electrical connections between adjacent lengths and with electrical appliances. In instances where the ducts are constructed for on the job fabrication, the electrical conductors may be laid therein in the conventional fashion; that is, after the duct sections are laid, continuous electrical conductors may be strung therein. However, in installations of wholly prefabricated and prewired ducts, means are provided at the ends of each length of duct to effect an electrical connection with the adjacent duct. Accordingly, dual appliance cord and interconnecting receptacles of a kind illustrated in Figs. 5 to 8, inclusive, may be incorporated in the prefabricated ducts. In general, each duct section preferably has an appliance cord and interconnecting receptacle 26 or 27 at each end. These receptacles are identical except that the receptacle 26 at one end of a length of duct is a male element and the receptacle 27 at the other end of said length is a female element so that abutted ends of adjacent lengths may be electrically connected.

As best shown in Figs. 7 and 8, the appliance cord and interconnecting receptacles may each consist of a block of insulation material of a size to fit snugly into the end of a channel 16 and, if desired, secured thereto by suitable means as the staples 28. The male receptacle illustrated has two prongs 29 anchored in said block and arranged to receive the bared ends of the conductors 18 which may be electrically secured therein as by set screws 31. In the instance of a female appliance, members similar to the prong members 29 are provided, but in that instance they are recessed to receive the prongs of the complemental male receptacle. In either event, each member 29 has a resilient blade 32 of electrically conductive material extending upwardly therefrom into a prong opening 33 in the block to be engaged by the prongs of an appliance cord plug 34. Normally, the prong openings 33 are concealed by the top covering on the duct but, when any one or more of the receptacles are to be used as outlets, the covering is pierced to expose the openings 33.

While we have shown and described dual appliance cord and interconnecting receptacles, it will be understood that the appliance cord connecting aspect of these devices could be eliminated without departing from the purview of our invention. In such instance, the members at opposite ends of each duct length would respectively include male and female arrangements as described above so as to thereby enable and facilitate interconnection of adjacent duct lengths. Moreover, it will be understood that appliance cord connecting elements could be provided in the conductor receiving channels other than at the ends thereof so as to thereby afford a plurality of places whereat an electrical appliance or the like could be connected to conductors housed within the duct.

When a duct of the aforesaid manner is cemented or otherwise suitably secured on a floor surface, articles may be readily rolled thereover without damage either to the duct or the conductors housed therein. Furthermore, because of the inclined side marginal portions of the duct the devices such as chairs and the like may be readily moved across the duct. Yet, further, and particularly because of the inclined marginal portions, the likelihood of persons tripping on the duct when it is cemented to a floor is obviated.

It will therefore be understood from the foregoing description that a duct arranged in the manner hereinabove described enables the above set forth and related objects of this invention to be realized. Therefore, while we have illustrated and described preferred embodiments of our invention, it is to be understood that these are capable of variation and modification and we therefore do not wish to be limited to the precise details set forth but desire to avail ourselves of such changes and alterations as fall within the purview of the following claims.

We claim:

1. A duct for insulated electrical conductors comprising, an elongated member having a longitudinal channel in its top face to receive the conductors therein, the top surface of said member being inclined from the top edges of the channel walls downwardly and outwardly toward the longitudinal edges of said member, and a flap disposed to overlie the inclined top surfaces and bridge the channel.

2. A duct for insulated electrical conductors comprising, an elongated member having a longitudinal channel in its top face to receive the conductors therein, the top surface of said member being inclined from the top edges of the channel walls downwardly and outwardly toward the longitudinal edges of said member, and a flap joined to a longitudinal edge of said member disposed to overlie the inclined top surfaces and bridge the channel.

3. A duct for insulated electrical conductors comprising, an elongated member having a longitudinal medial channel in its top face to receive the conductors therein, the top surface of said member being inclined substantially from the top edges of the channel walls downwardly and outwardly toward the longitudinal edges of said member, a strip of material arranged over the top surfaces of said member and bridging the channel, said strip being hingedly connected along one longitudinal edge thereof to a longitudinal margin of said member.

4. In a duct for insulated electrical conductors, a base formed of two elongated strips of flexible material having their complemental margins joined by a pair of spaced rows of stitches disposed one adjacent each of said margins, at least two longitudinal rows of stitches joining said strips inwardly of said margins, stiffening members arranged between the two strips of material one between each inner row of stitches and the respective marginal row of stitches, said stiffening members being substantially triangular in section and having their apex edges disposed toward the respective margins to provide a relatively deep channel in the stitched area between said stiffening members, a strip of material disposed to overlie the channel, and a row of stitches securing one edge of said strip to one margin of the base.

5. In a duct for insulated electrical conductors, a base formed of two elongated strips of fabric arranged one over the other, a row of stitches securing the complemental margins of said strips together, two stiffening members inserted between the two strips of fabric, said members being spaced apart transversely, at least one row of stitches securing the two strips of fabric together between said members to define a conductor receiving channel, the members being substantially triangular in section and having their base edges disposed toward each other to provide considerable depth to said channel, and a covering strip to overlie the channel.

6. In a duct for insulated electrical conductors, a base formed of two elongated strips of fabric arranged one over the other, a row of stitches securing the complemental margins of said strips together, two stiffening members inserted between the two strips of fabric, said members being spaced apart transversely, means securing the two strips of fabric together between said members to define a conductor receiving channel, the members being substantially triangular in section and having their base edges disposed toward each other to provide considerable depth to said channel, and a covering strip to overlie the channel, said covering strip having a hinged connection with said base.

7. A duct for insulated electrical conductors comprising, an elongated flexible member formed of two thicknesses of material having two transversely spaced pockets coextensive with its length, a stiffening member inserted in each of said pockets, said stiffening members being substantially triangular in section and having their base edges disposed toward each other to provide a channel therebetween to receive the electrical conductors, and a flexible cover bridging said channel.

8. A duct for insulated electrical conductors comprising, an elongated member having a longitudinal channel in its top face to receive the conductors therein, the top surface of said member being inclined substantially from the top edges of the channel walls downwardly and outwardly toward the longitudinal edges of said member, a flexible flap joined to a longitudinal edge of said member to overlie the inclined top surfaces and bridge the channel, and a reinforcing strip on said flap to be disposed over the channel when the flap is in place thereover.

9. A duct for insulated electrical conductors comprising, a pair of elongated members substantially triangular in section, said members being arranged on a surface with their base edges disposed toward but spaced from each other to define side walls of a channel to receive the conductors, a flexible covering for said members, said covering bridging the channel and having its margins disposed over and substantially parallel to said surface, and means disposed between each of said margins and said surface to secure said margins to said surface to maintain the covering taut.

10. A duct for insulated electrical conductors comprising, a strip of flexible material, means to secure a longitudinal area of said strip inwardly of its margins to a surface, a pair of transversely spaced stiffening members arranged on said secured area, a covering for said strip provided by one marginal area of the strip, said covering extending across and being depressed into the gap between said stiffening members, a second covering provided by the other marginal area of said strip overlying said first mentioned covering and bridging said gap, and means to secure said second cover in place to retain it taut.

ALEX M. GEIST.
REX R. WINDERS.